No. 892,835. PATENTED JULY 7, 1908.
N. W. HURST.
PLANETARIUM.
APPLICATION FILED DEC. 30, 1907.
3 SHEETS—SHEET 2.
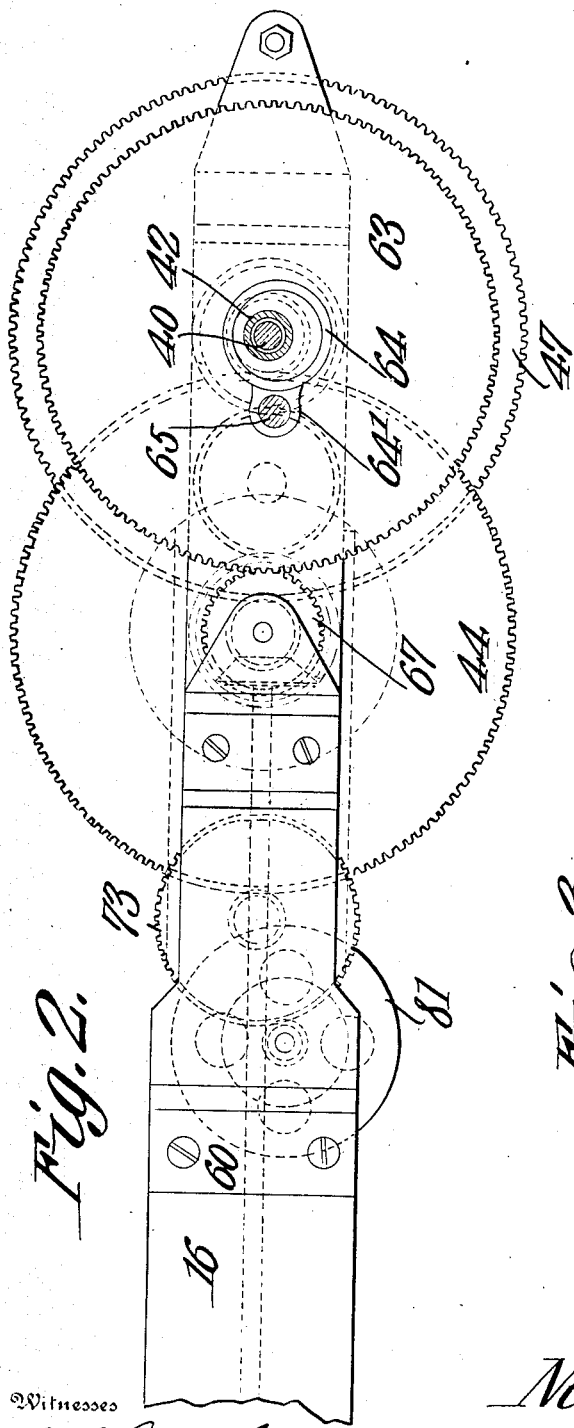
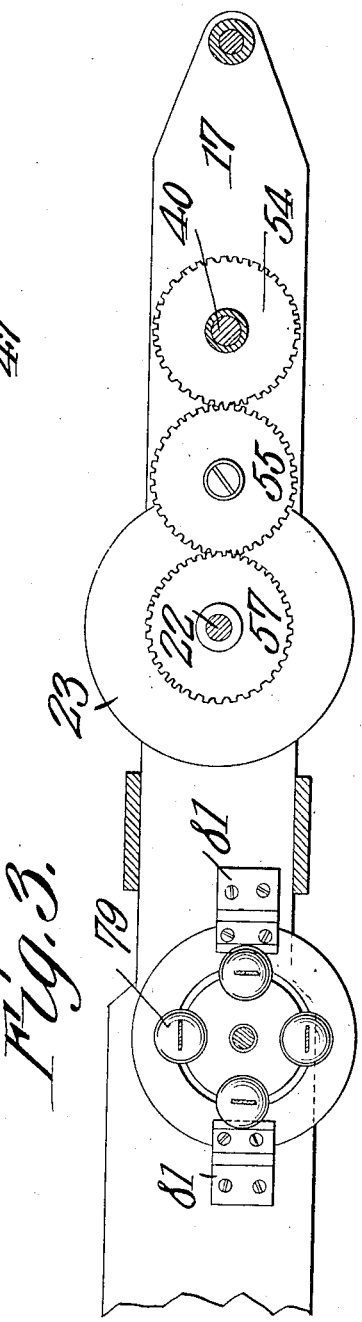
Inventor
Needham W. Hurst.

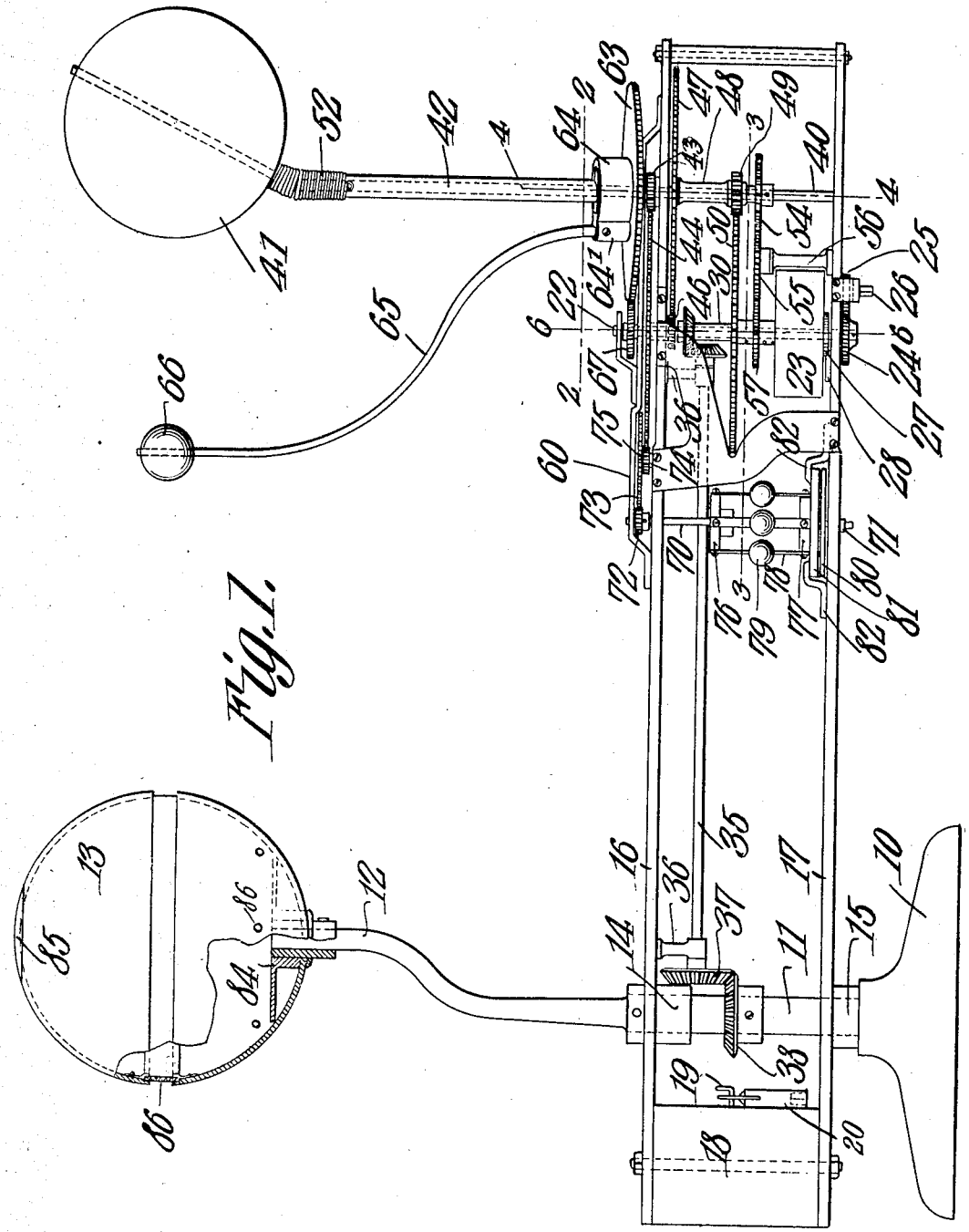

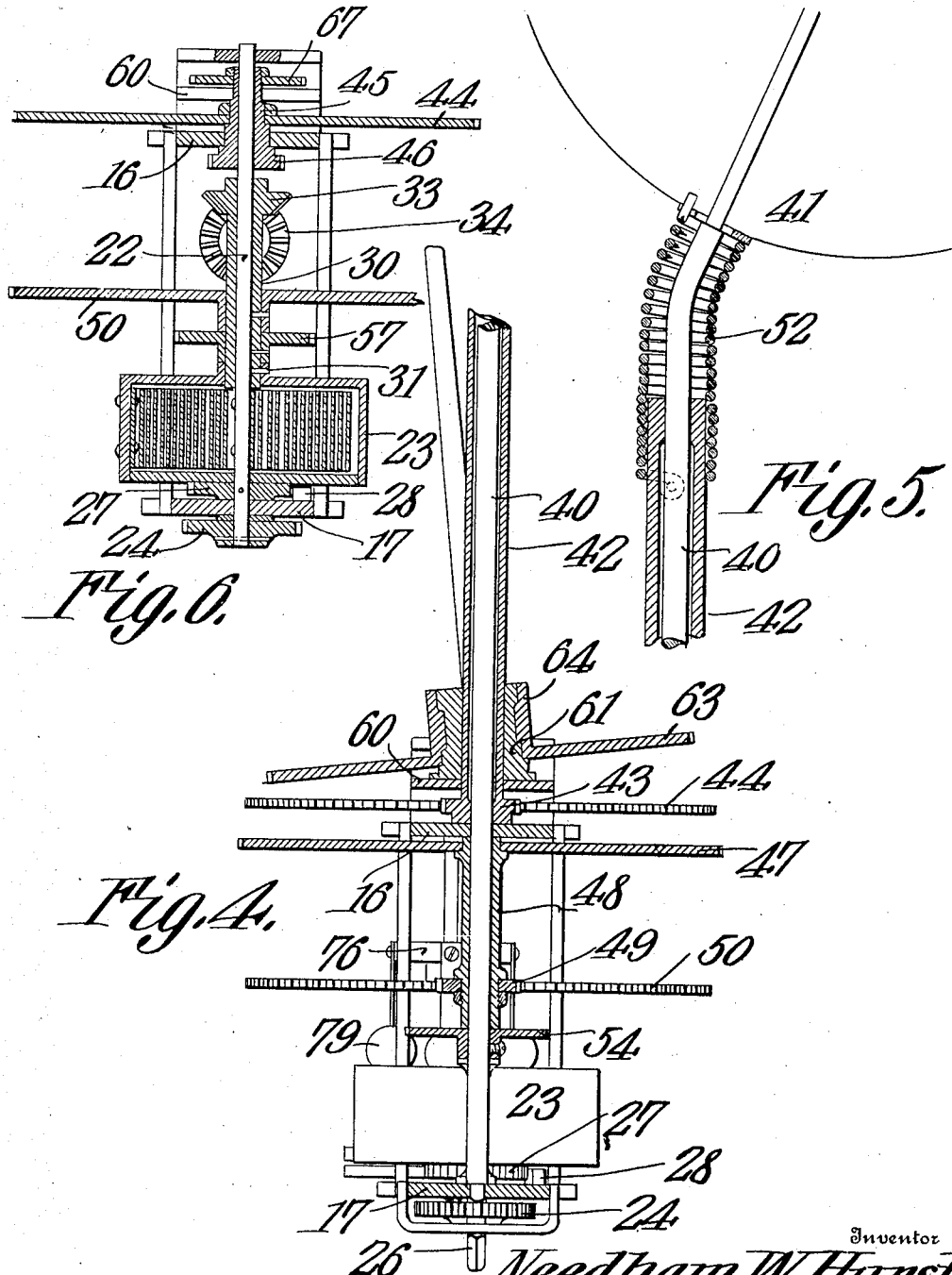

UNITED STATES PATENT OFFICE.

NEEDHAM W. HURST, OF BLAKELY, GEORGIA.

PLANETARIUM.

No. 892,835.   Specification of Letters Patent.   Patented July 7, 1908.

Application filed December 30, 1907. Serial No. 408,615.

*To all whom it may concern:*

Be it known that I, NEEDHAM W. HURST, a citizen of the United States, residing at Blakely, in the county of Early and State of Georgia, have invented a new and useful Planetarium, of which the following is a specification.

This invention relates to educational appliances of that class employed for illustrating the movements of the planets individually and with relation to each other and the attendant phenomena automatically and without further attention from the instructor or lecturer than the mere winding of the motor mechanism, and the principal object is to provide a novel apparatus of this type which may be made to represent the planetary system on any scale.

A further object of the invention is to simplify and improve devices of this class, and to provide the same with a simple form of motor mechanism and gearing connections for effecting the diurnal rotative movement of the earth globe; the orbital movement of the earth globe around the sun globe, and the orbital movement of the moon globe around the earth globe, while at the same time securing the fixed angular position of the earth globe axis to the plane of the ecliptic.

A still further object of the invention is to provide a novel form of mounting and operating mechanism for the moon globe, so that the axis of the latter may be preserved at an angle of about five degrees to the plane of its orbit.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation, partly in section, of a planetarium constructed in accordance with the invention. Fig. 2 is a sectional plan view of the same on the line 2—2 of Fig. 1, the view being on an enlarged scale. Fig. 3 is a similar view on the line 3—3 of Fig. 1. Fig. 4 is a vertical section on the line 4—4 of Fig. 1. Fig. 5 is a detail view of the flexible shaft connection of the earth globe. Fig. 6 is a section on line 6—6, Fig. 1.

Similar numerals of reference are employed to indicate corresponding parts throughout the several figures of the drawings.

The apparatus may be made of any suitable size and is carried by a base 10 from which rises a standard 11, the upper portion of the standard being off set to form a crank 12 on which is mounted a sun globe 13 of a construction hereinafter described. On the standard are mounted collars 14 and 15 that serve as supports for a pair of horizontally disposed frame bars 16 and 17, that have openings for the passage of the standard and are arranged to revolve with the standard as a center of movement. These frame bars extend out in one direction to any desired distance and serve as supports for an earth globe and moon globe, while the opposite ends of said arms are connected together by a counter-balancing weight 18 that serves to prevent any sagging of the longer end of the frame and preserves said frame in a strictly horizontal position. Extending from the weight 18 is a hook 19 on which the winding key or a weight 20 may be hung in order to secure an exact balance, and thus reduce friction between the frame and the standard around which said frame revolves.

Mounted in bearings formed in the frame bars 16 and 17 is a vertically disposed shaft 22, the lower portion of which passes through a spring barrel 23 that contains a spiral motor spring of any desired strength, one end of the spring being secured to the shaft and the other end to the inner wall of the spring barrel. To the lower end of the shaft is secured a gear wheel 24 that intermeshes with a pinion 25 on a winding arbor 26 to which an ordinary form of clock key may be applied for the purpose of winding up the spring. To the shaft is, also, secured a ratchet wheel 27 with which engages a spring pressed pawl 28 for the purpose of holding the spring in wound position, the shaft being arranged to rotate only during the winding of the spring and remaining stationary while the unwinding of the spring operates to rotate the spring barrel.

Mounted loosely on the shaft 22 is a hollow shaft 30 to which the spring barrel is secured by a locking pin or key 31, and secured to or formed integral with the upper end of the hollow shaft is a miter gear 33 intermeshing with a miter gear 34 at the outer end of a horizontally disposed shaft 35 that is mounted in hangers 36 depending from the upper frame bar 16. At the inner end of the shaft 35 is a miter gear 37 intermeshing with a miter gear 38 that is rigidly secured to the fixed standard 11, so that the unwinding of the spring will operate through these gearing connections to effect rotative movement of the frame around the standard 11 and as the sun globe is off set from the axis of the standard, the northward inclination of the earth globe axis will be compensated for.

Journaled in the upper and lower bars of the frame is a vertically disposed shaft 40, the upper portion of which is bent at an angle of $23\frac{1}{2}$ degrees to the vertical axis of the sun globe, and on this angularly bent portion of the shaft is mounted an earth globe 41.

Mounted loosely on the shaft 40 is a hollow shaft 42 to the lower end of which is secured a pinion 43 that intermeshes with a gear 44 that is carried by a sleeve 45 loosely mounted on the shaft 22. To the lower end of the sleeve 45 is secured a pinion 46 that intermeshes with a gear 47 that is rigidly secured to a sleeve 48. The sleeve 48 is revolubly mounted on the shaft 40, and to its lower end is secured a pinion 49 that intermeshes with a gear 50, the latter being keyed or otherwise secured to the hollow shaft 30. This forms a train of gearing by which rotative movement is imparted to the shaft 42, the gearing being so proportioned that the shaft 42 will be rotated $365\frac{1}{4}$ times during each complete rotative movement of the frame around the standard 11. The upper end of the shaft 42 is connected to the lower portion of the earth globe by means of a spring 52 that surrounds the bend of the shaft 40 and forms a flexible shaft.

The mechanism as thus far described will effect the orbital movement of the earth globe around the sun globe, and for each complete orbital movement the earth globe will be rotated on its axis $365\frac{1}{4}$ times.

In order to maintain the axis of the earth globe in an approximately direct line with polaris, it becomes necessary to keep the shaft 40 in precisely the same position during the revolution of the frame around the standard 11. For this purpose the lower portion of the shaft 40 carries a gear 54 which meshes with a gear 55 mounted at the upper end of a stud 56, and the gear 55 meshes with a gear 57 that is secured to the hollow shaft 30, the three gears 54, 55 and 57 being of uniform diameter so that the shaft 40 will remain stationary so far as regards movement about its axis, but will apparently receive one rotative movement for each complete rotative movement of the frame.

Secured to the opposite frame bar 16 is a long strap or bridge piece 60 that is provided with openings for the passage of the sleeves 45 and 42, and to this strap is secured an oblique bearing sleeve 61, the axis of which is approximately at an angle of five degrees from the axis of the shaft 42. Mounted on this sleeve is a gear wheel 63 having an enlarged hub 64 that rotates around the sleeve so that the gear wheel is held in a plane about five degrees from the horizontal. Extending from the sleeve is a boss 64, to which is secured the lower end of a reversely curved arm 65 on the upper end of which is mounted a moon globe 66. The gear 63 meshes with a gear 67 that is permanently secured to the upper end of the sleeve 45, the gearing being so proportioned that the moon globe will be traveled around the earth globe approximately thirteen and one-half times during each complete orbital movement of the earth globe around the sun globe, while the obliquely disposed sleeve and gear will cause the travel of the moon globe in an orbital path about five degrees from the plane of the ecliptic.

Mounted in the frame is a vertical shaft 70 the lower end of which is stepped in a bearing sleeve 71 carried by the lower bar 17 of the frame, and to the upper end of this shaft is secured a pinion 72 that intermeshes with a gear 73 mounted loosely on the arbor 74. To one side of the gear 73 is secured a pinion 75 that intermeshes with a large gear 44, so that the shaft 70 will be rapidly rotated. On the shaft is mounted a centrifugal governor comprising an upper disk 76 fixed to the shaft, and a lower loose disk 77, these disks being connected by springs 78 which carry suitable weights 79. To the lower disk 77 is secured a friction ring 80 that is arranged to engage against a stationary friction ring 81 that is supported by a pair of brackets 82 that are carried by the lower frame bar 17, and when the speed is abnormal the disk 80 will be raised into engagement with the disk 81 for the purpose of frictionally retarding the operation of the device.

In the lower portion of the sun globe is a horizontally disposed disk 84 which forms a support for a lamp, the latter being removable through an opening at the top of the sun globe, said opening being normally closed by a cover 85 and in the lower portion of the globe are openings 86 for the admission of air to support combustion, or an electric light may be employed if desired.

The globe or sphere 13 is formed of two incomplete hemi-spherical sections that are connected together by a ring 86 formed of glass or other translucent material, the ring of glass following the equatorial belt of the sun globe, and the rays of light from the lamp will be projected outward in imitation of the sun rays, so that the phenomena of day and night and eclipses of the sun by the moon may be readily observed.

I claim:—

1. In a planetarium, a standard having a cranked upper end, a sun globe secured thereto, a counter-balance frame revolubly mounted upon the standard, a motor mechanism supported by the frame and geared to the standard, a governor for controlling the speed of the motor mechanism, a vertical shaft supported by the frame and having an angularly bent upper end, an earth globe mounted in the upper end of the shaft, gearing connections between the shaft and the motor, a hollow shaft surrounding said vertical shaft and having a flexible connection with the earth globe, gearing connections between the motor and the hollow shaft, a gear arranged to revolve around the hollow shaft and connected to the motor, an arm supported by said gear, and a moon globe mounted on said arm.

2. In a planetarium, a standard, a sun globe carried thereby, a counter-balanced frame revolubly mounted upon the standard, a motor mechanism supported by the frame, a motor governor, a vertical shaft supported by the frame and having an angularly bent upper end, an earth globe at the upper end of the shaft, gearing connections between the shaft and motor, a hollow shaft surrounding the vertical shaft and having a flexible connection with the earth globe, gearing connections between the hollow shaft and the motor, a boss surrounding the hollow shaft and having its axis in a plane oblique to that of the shaft, a gear revolubly mounted upon the boss and connected to the motor, an arm secured to the gear, and a moon globe mounted upon said arm.

3. In a planetarium, a standard, a sun globe, carried thereby, a counter-balanced frame revolubly mounted upon the standard and comprising a pair of spaced upper and lower bars, a motor carried by the frame, a gearing connection between the motor and the standard, a bridge piece secured to the upper bar of the frame, a centrifugal governor, a friction member carried thereby, a stationary friction member with which the governor carried friction member is arranged to engage, a transmission gear between the governor and the motor and mounted in part between the upper bar of the frame and the bridge, a vertically disposed shaft journaled in the frame and provided with an angularly bent upper end, an earth globe at the upper end of the shaft, gearing connections between the shaft and motor, a hollow shaft surrounding the vertical shaft and having a flexible connection with the earth globe, gearing connections between the hollow shaft and the motor, a boss secured to the bridge piece and having an opening for the passage of the hollow shaft, the axis of said boss being disposed in a plane oblique to that of the shaft, a gear mounted upon the boss and operatively connected to the motor, a reversely curved arm secured to the hub of the gear, and a moon globe arranged at the upper end of said arm.

4. In a planetarium, a sun globe comprising a pair of incomplete hemi-spherical members, and an annulus of transparent material connecting the hemi-spherical members, said globe being hollow and having an internal support for an illuminating device.

5. In a planetarium a standard, a sun globe thereon, a counterbalanced frame revolubly mounted on the standard, a motor carried by the frame and geared to the standard, a centrifugal governor for controlling the frame, a vertical shaft supported by the frame, an earth globe thereon, gearing connections between the shaft and motor, a hollow shaft surrounding said shaft and flexibly connected to the earth globe, gearing connections between the motor and hollow shaft, a member arranged to revolve around the hollow shaft and connected to the motor, and a moon globe movable therewith and around the earth globe.

In testimony that I claim the foregoing as my own, I have hereto affixed my signature in the presence of two witnesses.

NEEDHAM W. HURST.

Witnesses:
W. D. RAY,
R. W. ALEXANDER.